Sept. 20, 1971     C. C. WALLACE     3,605,203
CLAW
Filed March 14, 1969
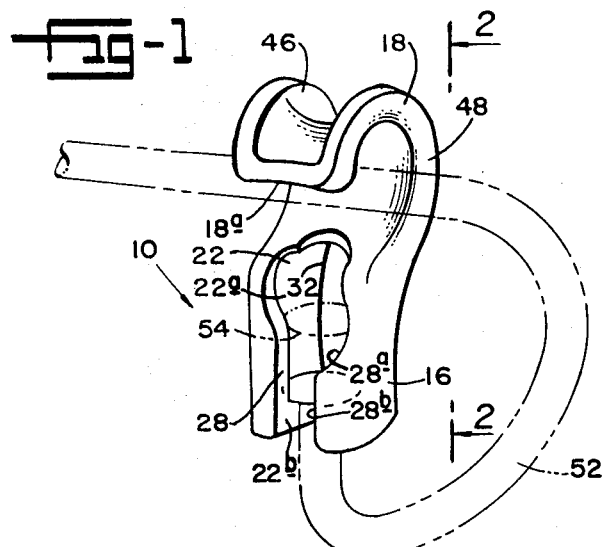
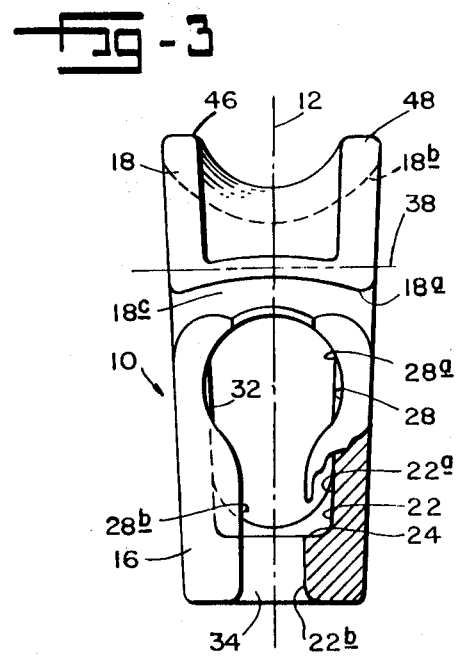
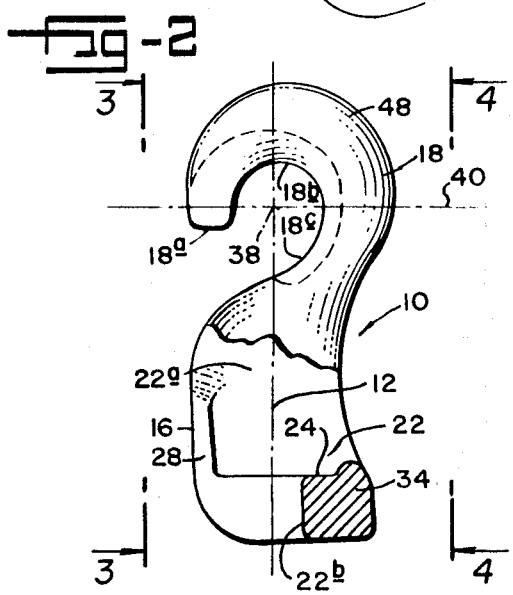
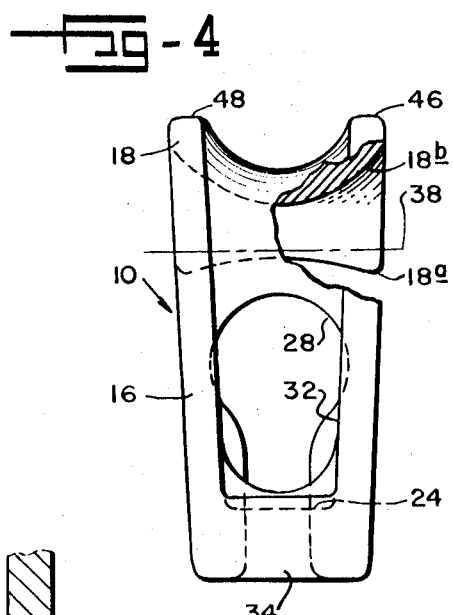
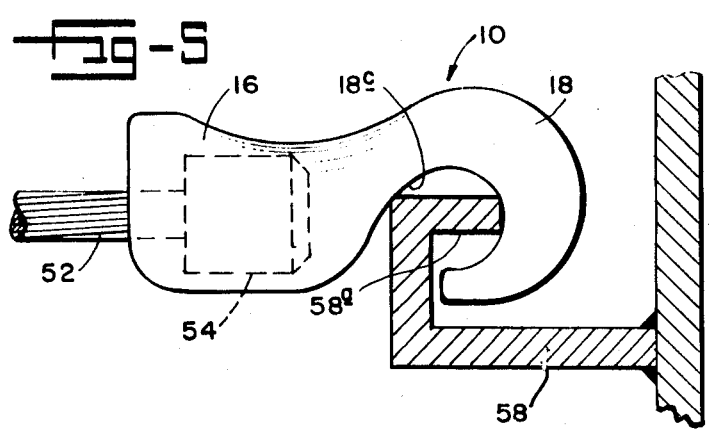
INVENTOR.
Charles C. Wallace
BY
KOLISCH & HARTWELL
ATTORNEYS

United States Patent Office 3,605,203
Patented Sept. 20, 1971

3,605,203
CLAW
Charles C. Wallace, Portland, Oreg., assignor to West Coast Wire Rope and Rigging of Portland, Inc., Portland, Oreg.
Filed Mar. 14, 1969, Ser. No. 807,313
Int. Cl. F16g *11/14, 11/00;* F16b *45/00*
U.S. Cl. 24—123
2 Claims

ABSTRACT OF THE DISCLOSURE

A claw for use in hoisting and securing loads including an elongated base adapted to be secured to the end of a line, with the line extending axially outwardly from one end of the base, and a hook formed integrally with the base and extending axially outwardly from the other end of the base. The base has a line-receiving passage extending therethrough, a slot on one side of the claw which permits slipping a line into the passage, and means in the passage for securing the line. The hook joins the base on the side of the claw opposite the slot, curves over the axis of the claw to form a saddle, and then extends along a line parallelling the axis of the claw toward the base on the one side of the claw. The hook terminates at a free end which is spaced axially from the base. A pair of spaced-apart flanges extend along the side of the claw opposite the slot and continue in flanges throughout the curvature of the hook.

---

This invention relates to a claw which is adapted to be secured to an end of a line for load hoisting and securing operations.

A general object of the invention is to provide a novel claw which is adapted to be releasably secured to the free end of a line, and which then can be used either to anchor the line on a channel iron, or as a choker hook in forming a bight in the line.

More specifically, an object of the invention is to provide a novel claw with one end which may be releasably secured to a line, with the line extending axially outwardly from such end of the claw, and an opposite end in the form of a hook which can function as an eye for receiving midregions of the line with the line formed as a loop. The hook also can be used in hooking the claw about a channel when anchoring the end of the line.

Other objects and advantages will become more fully apparent as the following description is read in conjunction with the drawings, wherein:

FIG. 1 is a perspective view of a claw constructed in accordance with an embodiment of the invention, and showing a line in dot-dash outline shaped by the claw to form a sling;

FIG. 2 is a side elevation of the claw taken generally along the line 2—2 in FIG. 1, and somewhat enlarged, with a portion broken away;

FIG. 3 is a front elevation view of the claw, taken generally along the line 3—3 in FIG. 2, with portions broken away;

FIG. 4 is a rear elevation view of the claw, taken generally along the line 4—4 in FIG. 2, with a portion broken away; and FIG. 5 shows the claw as it may be used in anchoring the end of a line on a channel member.

Referring now to the drawings, a claw as contemplated is indicated generally at 10. The longitudinal axis of the claw is indicated by a vertical line 12 in FIGS. 2 and 3. The claw comprises, in broad terms, an elongated base 16 extending axially of the claw, and a hook 18 formed integrally with the base.

Extending axially through the base is a line-receiving passage 22. The passage includes a central portion 22a having a diameter slightly larger than the diameter of a ferrule which might be provided at the end of a line to be received within the passage. The lower end of the passage, designated at 22b in FIGS. 2 and 3, is somewhat narrower than central portion 22a, and is for the passage of a line therethrough. An axially inwardly facing shoulder 24 is defined adjacent the lower end of the base where portions 22a, 22b join.

Base 16 also includes a slot 28 which extends along one side of the claw. The slot progresses axially inwardly from the lower end of the base and joins at its rear with passage 22. As is best seen in FIGS. 1 and 3, slot 28 has a substantially keyhole-shaped configuration. Upper portion 28a of slot 28 has a diameter which is sufficient to allow the passage of a ferrule therethrough into central portion 22a of passage 22, and the lower, or narrower, portion 28b of the slot is of sufficient width to permit the passage of a line therethrough.

The base also includes an opening 32 defined on the rear side of the claw, on the side opposite slot 28. This opening is in transverse alignment with a portion of slot 28. Opening 32 is bounded adjacent the lower end of the base by a web 34 which extends between the sides of the claw.

Describing hook 18 now in greater detail, and referring specifically to FIG. 2, it will be seen that the hook includes a shank which extends in an axial direction outwardly from the upper end of the base on the side of the claw opposite the side having a slot 28. The hook at its outer, or upper, extremity progresses in a course that first curves inwardly across the axis of the claw, and then extends toward the base on the side of the claw having slot 28. The free end of the hook, indicated generally at 18a, is disposed adjacent the base, but is spaced axially therefrom to define an open throat between this free end of the hook and the base.

The inner surface of the hook at the outer, or upper, extremity defines a saddle, indicated generally at 18b in FIGS. 2, 3 and 4, as it curves arcuately about a saddle axis which is indicated at 38. Axis 12 of the claw and a horizontal line 40 intersect in FIG. 2. Lines 38 and 40 of FIGS. 3 and 2, respectively, may be considered to represent the edges of a plane passing through the saddle axis and normal to the longitudinal axis of the claw. As is best seen in FIG. 2, free end 18a of the hook is disposed some distance toward the base from this plane. It will also be seen in FIG. 2 that the hook, between line 40 and free end 18a, is substantially straight, i.e., extends along a course which substantially parallels the longitudinal axis of the claw.

Referring still to FIG. 2, the inner surface of the hook, progressing toward the base from the plane represented by line 40, extends in a sweep, indicated generally at 18c, which sweep is concavo-convex and has a greater radius of curvature than the arcuate curvature of saddle surface 18b. Further, this sweep crosses the longitudinal axis of the claw at a point spaced a substantial distance toward the lower end of the claw from free end 18a of the hook and the convex curvature begins substantially where the sweep crosses the longitudinal axis. Saddle surface 18b and sweep 18c together define a pocket in the claw.

A pair of opposed spaced-apart flanges 46, 48 extend axially of the claw progressing from web 34. The flanges continue in flange continuations that extend along the hook and across the outer extremity of the hook. Each flange continuation has considerable depth where it extends along the shank of the hook and over the outer extremity of the hook. Each flange continuation then decreases in depth on nearing free end 18a of the hook. The flanges and their continuations strengthen the hook without substantially increasing its weight. In the base of the hook the space between the flanges is used in manipulating a ferrule when seating it.

Explaining now how the claw might be used to form a loop, or sling, in a hoisting operation, and referring specifically to FIG. 1, the free end of a line, indicated in dot-dash outline at 52, and having a ferrule 54 secured to it, first may be secured to the base of the claw. The line is secured to the base by passing the ferrule through the enlarged portion of opening 28 and into the central portion 22a of the passage, and then moving the line immediately adjacent ferrule 54 laterally through the narrower portion of slot 28 and into the line-receiving passage, with line 52 then extending axially outwardly from the lower end of the base. The line and ferrule are then pulled downwardly, until the lower end of the ferrule seats against shoulder 24, which serves to secure the end of the line within the line-receiving passage.

The line may then be passed around a load and a portion of line 52 remote from ferrule 54 slipped laterally through the open throat of the hook and against the saddle surface of the hook to form a loop, or sling, as illustrated in FIG. 1. Lifting of the end of line 52 remote from ferrule 54 causes the hook portion of the claw to slide along the line with tightening of the line about the load.

The construction of the base of the claw permits the free end of a line to be secured easily to the claw, and the open throat provided by the hook obviates the need for threading the line through an eye to form a loop before the line is passed around a load to lift it.

In FIG. 5, the claw is shown as it is used in anchoring the end of a line to a channel iron, or similar support, 58 found in the hull of a ship. When used in this manner, the ferrule is seated as before against shoulder 24 and the hook portion of the claw is placed about a flange 58a of the support with the edge of flange 58a coming to bear against the saddle surface of the hook portion, approximately at the longitudinal axis of the claw. By providing sweep 18c along the inner shank of the hook portion, and where the hook portion joins with the base in the claw, suitable clearance is provided to enable this positioning of the edge of flange 58a. With the claw so seated, and when the line is tensed, this results in the load produced being supported in a region which lies on the longitudinal axis of the claw. The free end of the hook is subjected to loading forces that would tend to produce straightening of the hook but, these forces are withstood by the flange continuations that extend about the outer portion of the hook. Web 34 which joins the flanges on the back of the claw contributes to rigidity in a region where the claw is divided which is at the bottom end of the base portion but on the front side of the base portion.

It is claimed and desired to secure by Letters Patent:

1. A claw comprising
an elongated base extending axially of the claw,
a line-receiving passage in said base extending axially inwardly from one end of the base,
a slot in said base extending along one side of the base, said slot progressing axially inwardly from the base's said one end and joining with the passage, means within the passage for releasably securing a line therein with such line extending axially outwardly from said one end of the base,
a hook formed integrally with the base, said hook extending in an axial direction outwardly from the other end of said base on the side of the base which is opposite the base's said one side,
said hook at its outer extremity and in profile progressing in a course that first curves inwardly across the axis of the claw and thence extends toward said one side of the base whereby the inner surface of the hook defines a saddle spaced from said other end of the base, said inner surface of the outer extremity of the hook viewing the profile of the hook curving arcuately about a saddle axis which intersects and is normal to the axis of the claw,
said hook having a free end which is disposed toward said other end of the base from a plane passing through said saddle axis and normal to the axis of the claw, but is spaced axially from said other end of the base to define an open throat between said free end and the base,
said inner surface of the hook extending in a sweep to join with said one side of the base which sweep is concavo-convex and of greater radius of curvature than the arcuate curvature of said inner surface of the hook at its outer extremity, said sweep crossing the longitudinal axis of the claw at a point spaced a substantial distance toward said one end of the base from said free end of the hook and defining an acute angle with respect to said axis of the claw where such extends toward said one end of the base, the convex curvature of the sweep beginning substantially where such crosses said longitudinal axis.

2. The claw of claim 1, wherein said hook progressing from said plane to its said free end extends along a course which substantially parallels the longitudinal axis of the claw.

References Cited

UNITED STATES PATENTS

| 1,493,285 | 5/1924 | Scafe | 24—123 |
| 1,549,093 | 8/1925 | Lachapelle | 24—123X |
| 1,959,985 | 5/1934 | Moll | 24—123X |
| 2,828,156 | 3/1958 | Hansen | 24—123X |
| 2,872,716 | 2/1959 | Ehmann et al. | 24—123 |
| 3,058,184 | 10/1962 | Ritzheimer | 24—123 |
| 3,409,950 | 11/1968 | Boyd | 24—123 |

DONALD E. WATKINS, Primary Examiner